R. J. MARDONEZ AND P. HANSEN.
PHONOGRAPH.
APPLICATION FILED APR. 13, 1920.
1,404,870.
Patented Jan. 31, 1922.
7 SHEETS—SHEET 5.
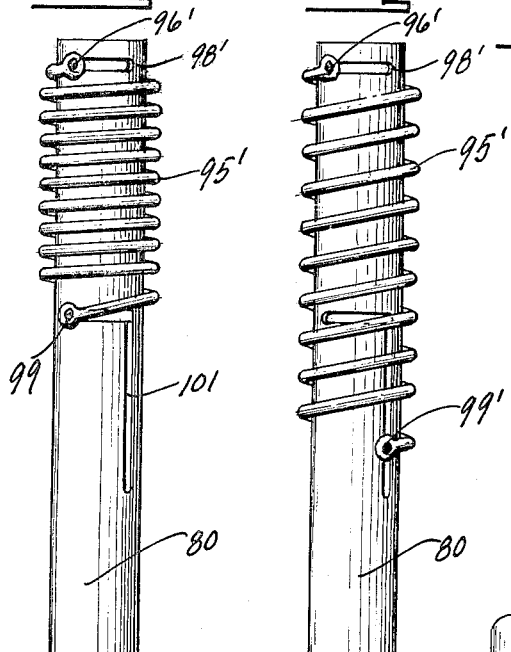
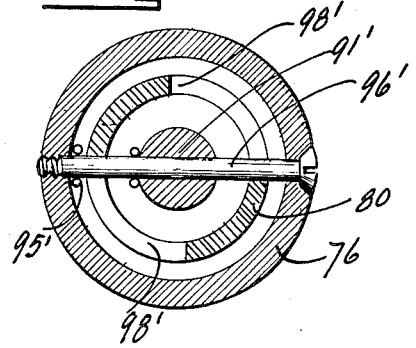
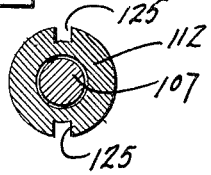
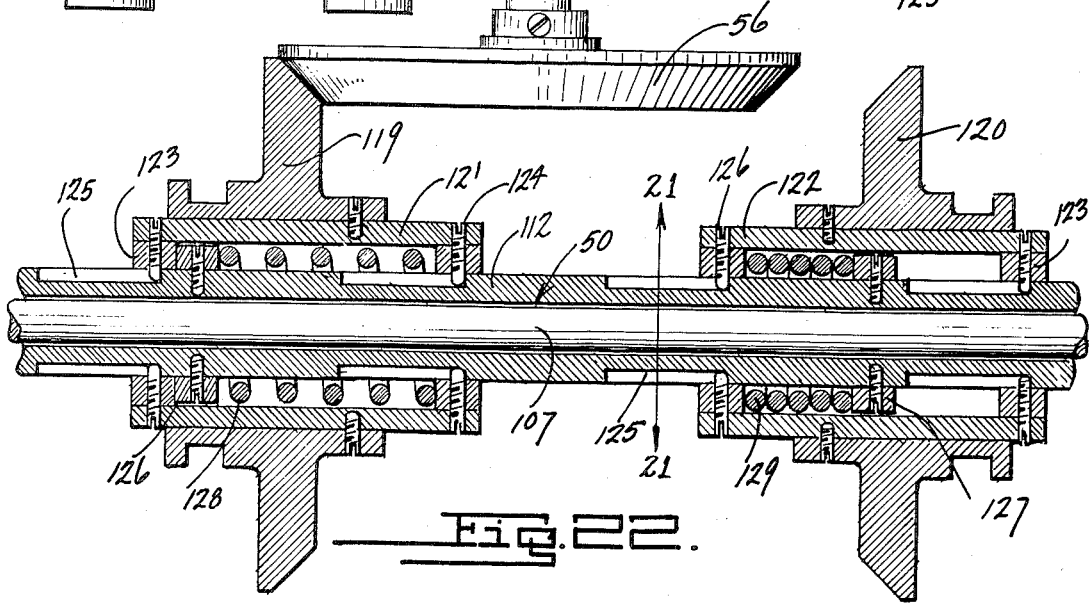
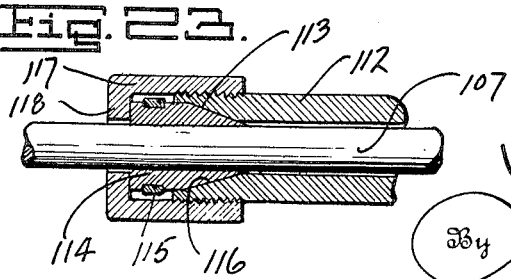

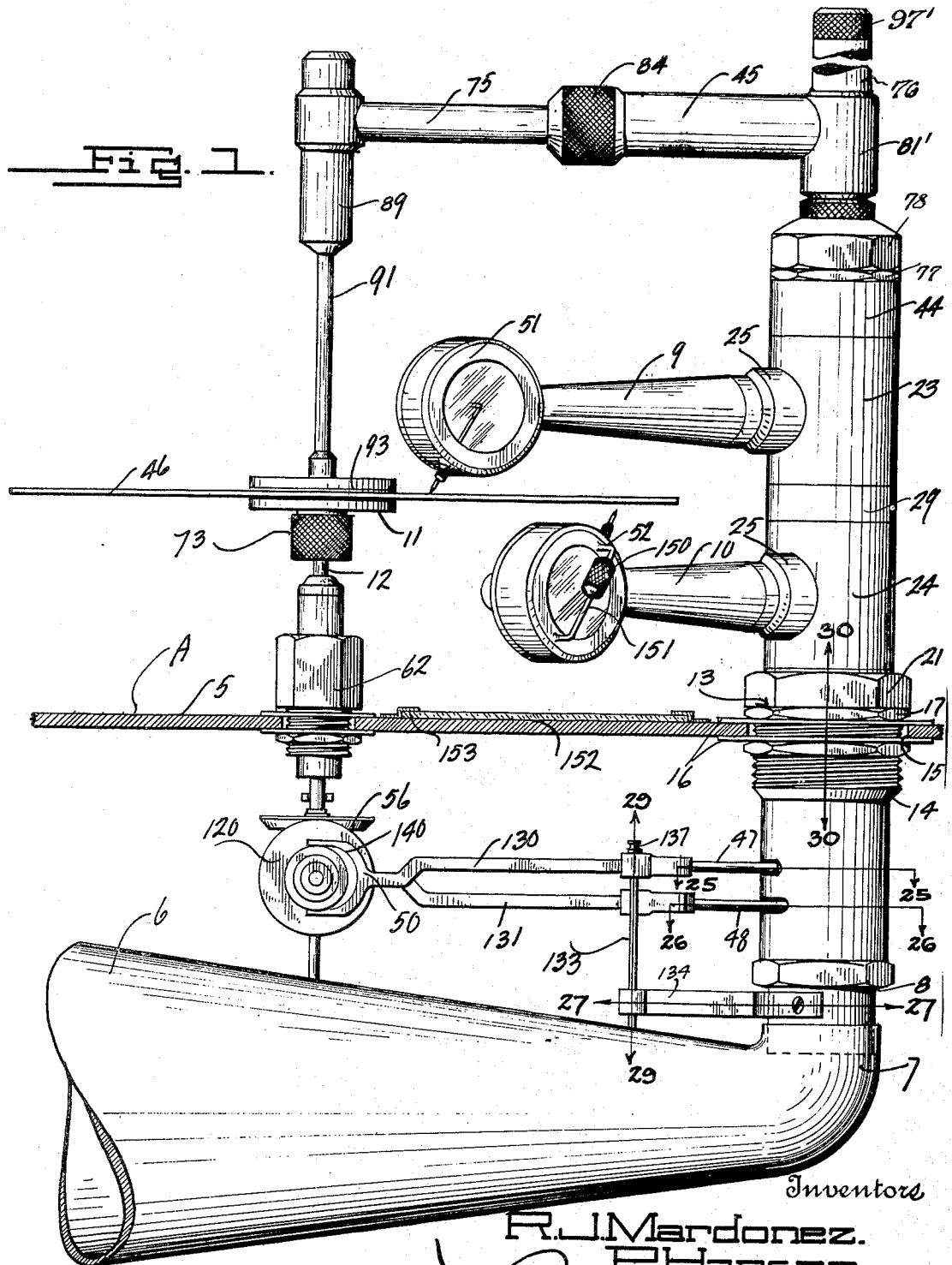

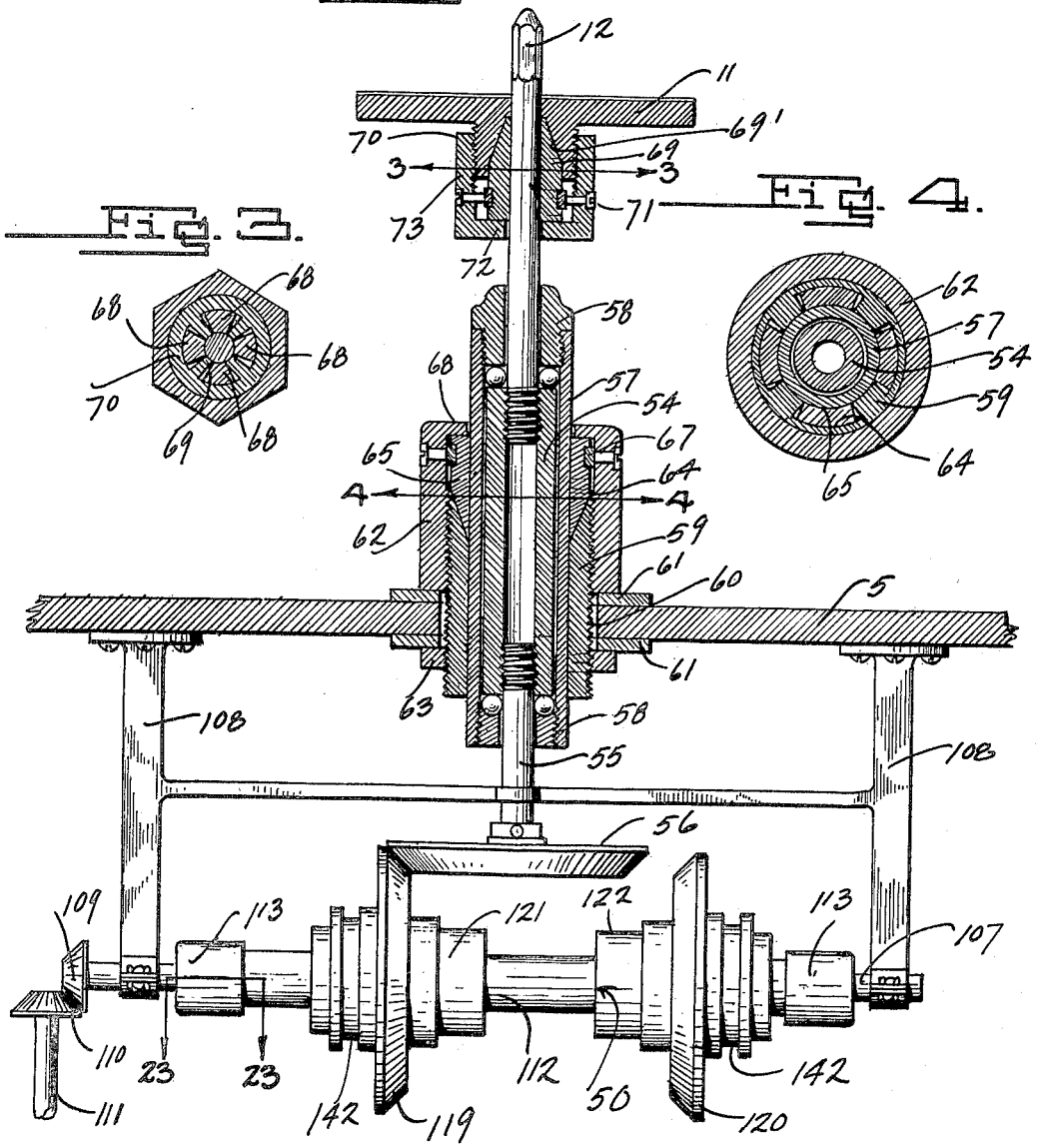
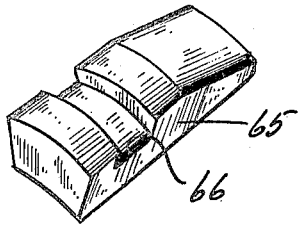

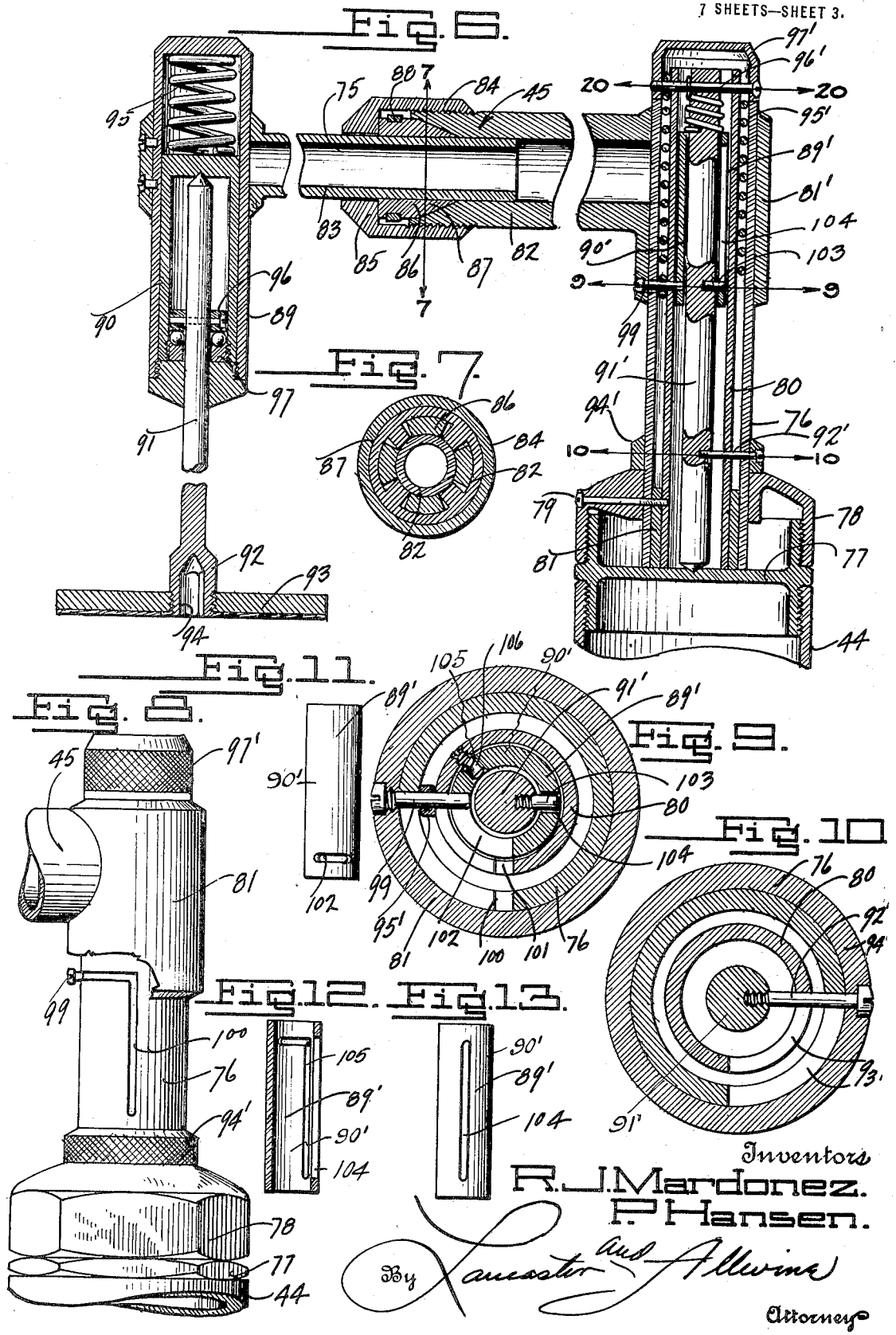

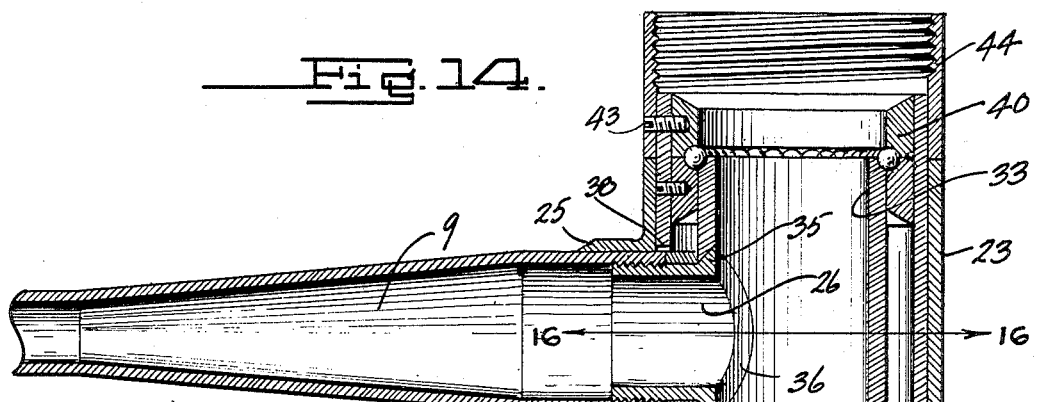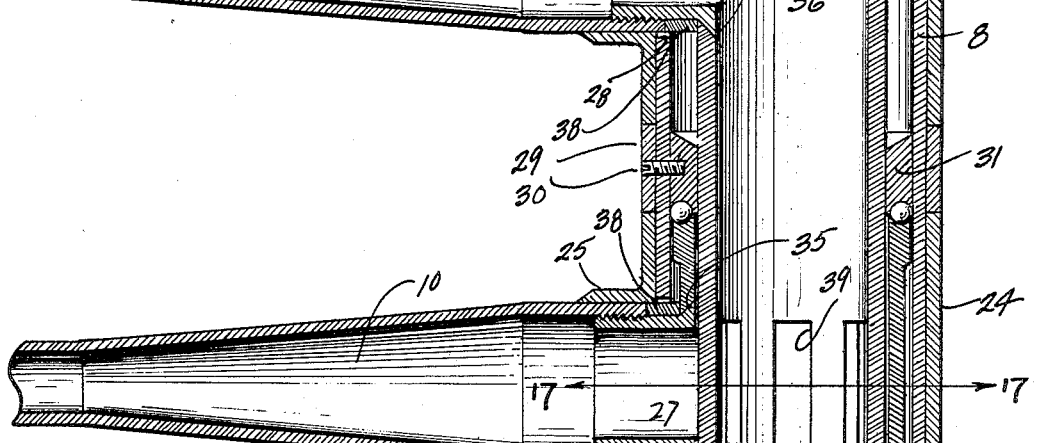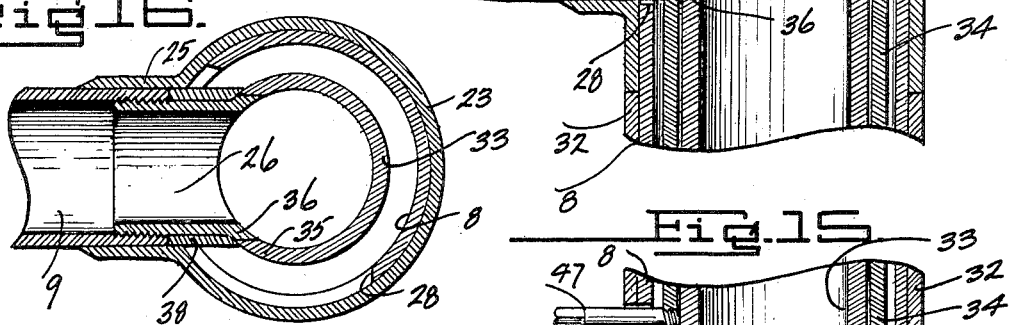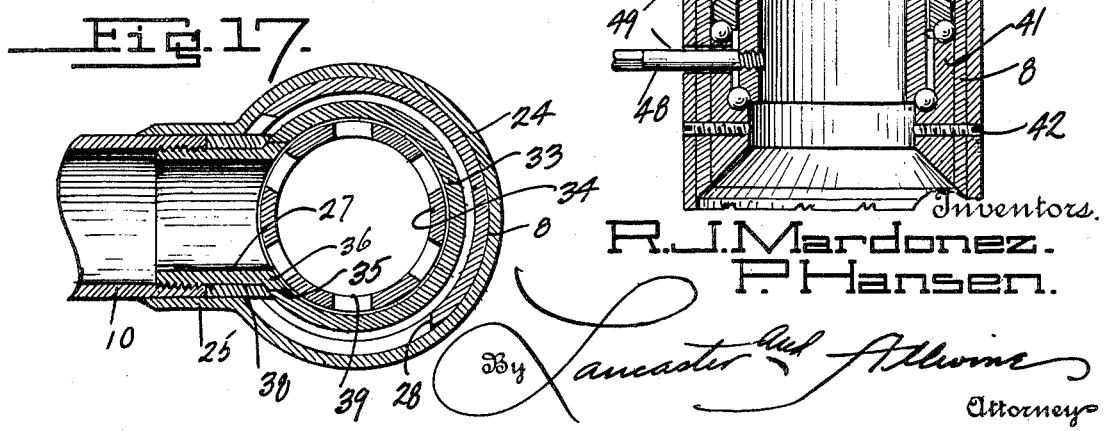

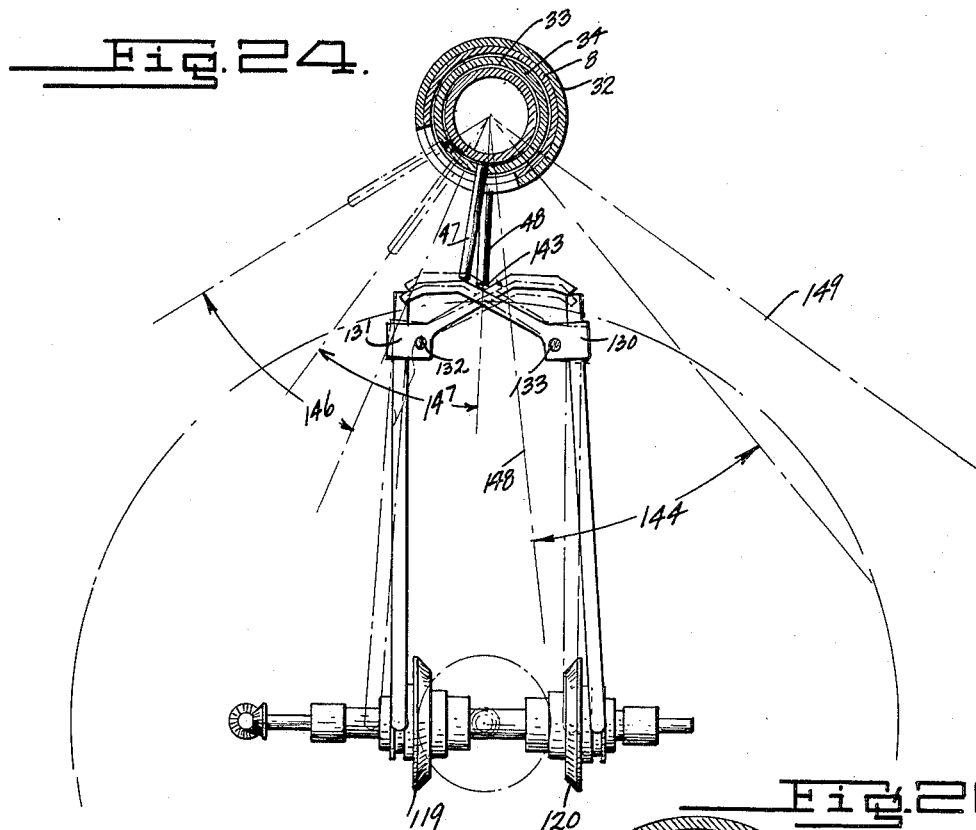
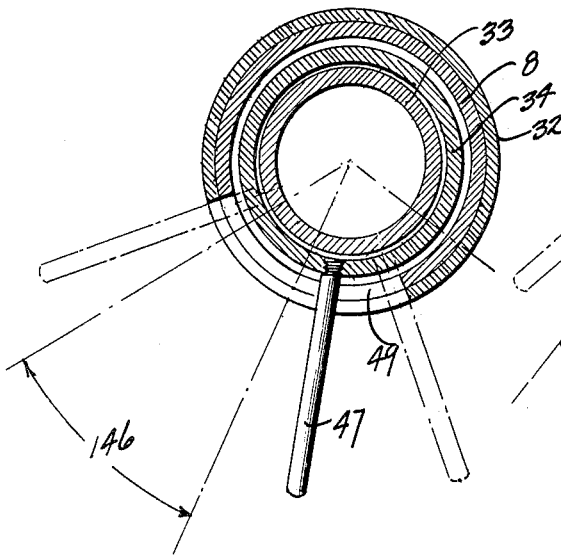
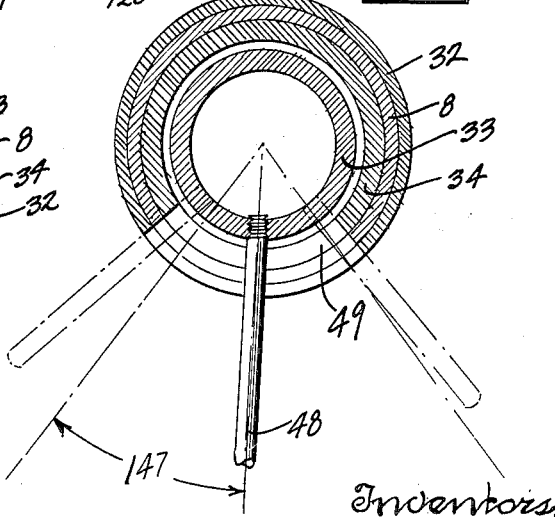

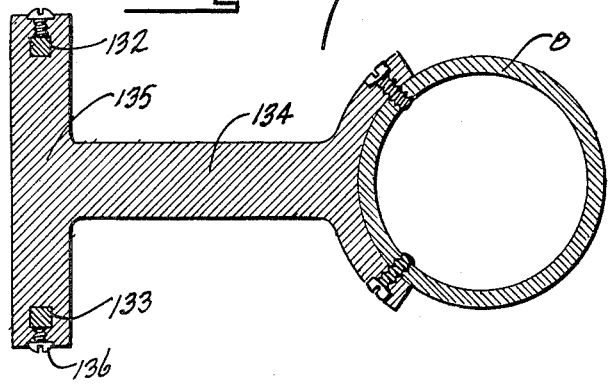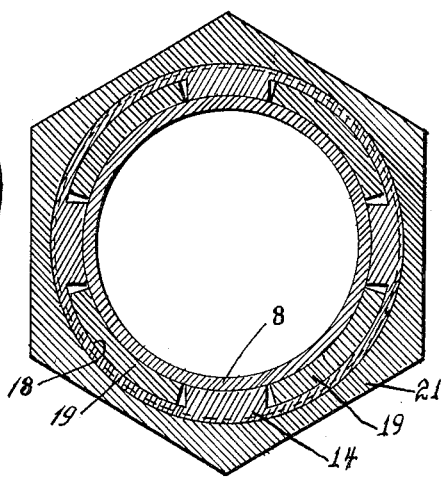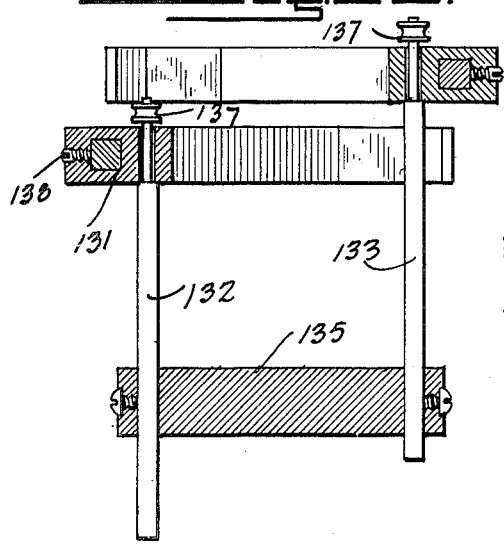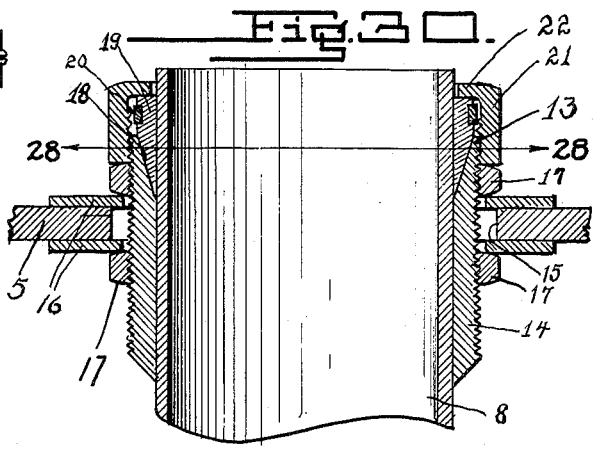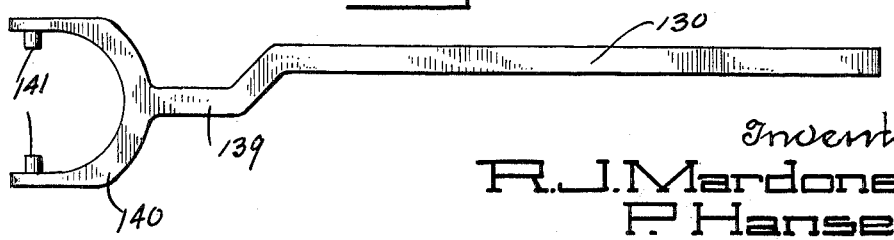

UNITED STATES PATENT OFFICE.

RAFAEL J. MARDONEZ AND PETER HANSEN, OF SEATTLE, WASHINGTON.

PHONOGRAPH.

1,404,870.   Specification of Letters Patent.   Patented Jan. 31, 1922.

Application filed April 13, 1920. Serial No. 373,479.

*To all whom it may concern:*

Be it known that we, RAFAEL J. MARDONEZ and PETER HANSEN, a citizen of Mexico and subject of Denmark, respectively, residing at Seattle, in the county of King and State of Washington, have invented certain new and useful Improvements in Phonographs, of which the following is a specification.

This invention relates to sound reproducing apparatus, and the primary object of the invention is to provide an improved phonograph or the like, in which the necessity of turning over a double disc record when one side thereof has been played and it is desired to play the other side is eliminated, thereby permitting practically the uninterrupted playing of the phonograph.

Another object of the invention is to provide an improved phonograph for playing both sides of a disc record embodying independent tone arms and reproducers for the upper and lower surfaces of the record, the tone arms and reproducers having a common sound amplifying horn.

A further object of the invention is to provide an improved phonograph for playing the upper and lower surfaces of a double disc record, in which the ordinary type of records now on the market can be used, thereby eliminating the necessity of providing special records having special sound grooves arranged thereon.

A further object of the invention is to provide an improved phonograph for playing both sides of a double disc record without turning the record over having means for automatically connecting and disconnecting the turn table pin with the motor upon movement of either of the tone arms, and having an improved means for controlling the direction of rotation of the turn table by the tone arms.

A further object of the invention is to provide an improved means for clamping the record or records in position, so as to prevent the accidental displacement thereof, while either side of the record is being played.

A further object of the invention is to provide an improved means for automatically locking the record engaging arm in position when the same has been moved into operative engagement with the upper surface of the record.

A further object of the invention is to provide means for holding the lowermost reproducer in engagement or out of engagement with the lower surface of the record being played.

A still further object of the invention is to provide an improved phonograph of the above character which is durable and efficient in use, one that is simple and easy to manufacture, and one which can be placed upon the market at a reasonable cost.

With these and other objects in view, the invention consists in the novel construction, arrangement and formation of parts as will be hereinafter more specifically described, claimed and illustrated in the accompanying drawings, forming a part of this specification, in which drawings:

Figure 1 is a fragmentary vertical section through a phonograph illustrating the improved means for playing the upper and lower surfaces of a record without reversing the position of the same.

Figure 2 is a fragmentary horizontal section taken at right angles to Figure 1 illustrating the means for connecting the turntable and center pin with the operating shaft.

Figure 3 is a detail horizontal section taken on the line 3—3 of Figure 2.

Figure 4 is a horizontal section taken on the line 4—4 of Figure 2.

Figure 5 is a detail perspective view of one of the wedging members used in the friction grips.

Figure 6 is an enlarged fragmentary vertical section through the clamp for holding the record in position against accidental displacement.

Figure 7 is a detail vertical section taken on the line 7—7 of Figure 6.

Figure 8 is an enlarged fragmentary elevation of the supporting post for the clamp, parts of the same being shown broken away.

Figure 9 is a detail horizontal section taken through the supporting post for the upper clamp taken on the line 9—9 of Figure 6.

Figure 10 is a detail horizontal section taken on the line 10—10 of Figure 6.

Figure 11 is a detail elevation of the inner locking sleeve carried by the disc clamping member.

Figure 12 is a vertical section through the same.

Figure 13 is an elevation of the locking sleeve taken at right angles to Figure 11.

Figure 14 is an enlarged vertical section through the supporting post and tone arms, Figure 15 is an enlarged fragmentary vertical section through the lower portion of the supporting post.

Figure 16 is a horizontal section through the supporting post and upper tone arm taken on the line 16—16 of Figure 14.

Figure 17 is a horizontal section through the supporting post and lower tone arm taken on the line 17—17 of Figure 14.

Figure 18 is a detail elevation of a stationary locking sleeve carried by the upper clamping member.

Figure 19 is a similar view illustrating the coil spring under tension, and the position of the same, when the clamp is in clamping position.

Figure 20 is a detail horizontal section taken on the line 20—20 of Figure 6.

Figure 21 is a detail section taken on the line 21—21 of Figure 22.

Figure 22 is an enlarged horizontal section through the means for connecting and disconnecting the drive shaft with the turn-table and center pin.

Figure 23 is an enlarged fragmentary section taken on the line 23—23 of Figure 2, illustrating the means of connecting the movable clutch sections on the drive shaft.

Figure 24 is a horizontal section through the supporting post of the tone arms illustrating the means carried by the tone arm sleeves for connecting and disconnecting the clutches with the turn-table and center pin.

Figure 25 is a horizontal section through the supporting post of the tone arms taken on the line 25—25 of Figure 1, showing the movement of the operating pin for the clutches for the tone arm for playing the lower surface of the record.

Figure 26 is a detail horizontal section taken on the line 26—26 of Figure 1 illustrating the movement of the operating pin actuated by the upper tone arm.

Figure 27 is an enlarged horizontal section taken on the line 27—27 of Figure 1 illustrating the supporting means for the pivots of the operating levers for the clutches.

Figure 28 is a detail horizontal section taken on the line 28—28 of Figure 30 illustrating the means for adjustably clamping the supporting post for the tone arms in position on the cabinet of the phonograph.

Figure 29 is an enlarged detail vertical section taken on the line 29—29 of Figure 1 illustrating the pivot pins carried by the supporting bracket for the levers for actuating the clutches.

Figure 30 is an enlarged fragmentary vertical section taken on the line 30—30 of Figure 1 showing the means for adjustably holding the supporting post for the tone arms in position, the sleeves carried by the tone arms being omitted.

Figure 31 is a detail plan view of one of the levers for operating the movable clutch section.

Referring to the drawings in detail, wherein similar reference characters designate corresponding parts throughout the several views, the letter A indicates the improved phonograph which includes the top plate 5 of the phonograph cabinet which may be of the ordinary or any preferred configuration, size or style and has arranged below the same the sound amplifying horn 6, which has its inner end tapered and out-curved as at 7 and connected to the cylindrical hollow posts 8 which rotatably support the upper end lower tone arms 9 and 10. The hollow supporting post 8 for the tone arms 9 and 10 extends upwardly through the top plate 5 in rear and one side of the turn table 11 and center pin mechanism 12 which will be hereinafter more fully described.

The hollow supporting post 8 is held in adjusted position on the top plate 5 by means of a lock 13, which is clearly shown in Figure 30 of the drawings and the same includes an externally threaded sleeve 14 which is extended through an opening 15 formed in the plate 5. Guard plates 16 are arranged on the upper and lower surfaces of the top plate 5 and surround the opening 15 and these plates are engaged by upper and lower nuts 17 adjustably carried by the externally threaded sleeve 14 which holds the sleeve against accidental displacement. The upper surface of the externally threaded sleeve 14 is provided with a plurality of spaced inwardly extending tapered slots 18 in which are slidably mounted the wedge members 19 which are held against accidental displacement in relation to each other by means of the retaining ring 20. These wedge members 19 are adapted to be forced into intimate contact with the tapered slots 18 and the outer surface of the hollow supporting post 8 by means of the adjusting nut 21 which is threaded on the externally threaded sleeve 14. The upper surface of the nut 21 is provided with an inwardly extending annular flange 22 which is adapted to engage the upper surface of the wedges and force the same inwardly. It can be seen that when the wedges are forced downwardly or inwardly the same will engage the tapered faces of the slots 18 and will be forced into engagement with the post 8 and thus hold the same against displacement. The hollow supporting post 8 has rotatably mounted thereon above the adjusting nut 21 the upper and lower rotatable collars 23 and 24 which carries respectively the oppositely extending tone arms 9 and 10. The collars 23 and 24 are each provided with an outwardly extending tubular extension 25 for the reception of the inner ends of the tone arms 9 and 10 and these tone arms have their inner surfaces provided with threads which are adapted to be engaged by externally threaded nipples 26 and 27 and the post 8 is provided with arcuate slots 28 for the reception of said nipples. The collars 23 and 24 are held in spaced relation to one another by the spacing ring 29, which is held in place by suitable fastening element 30 which also supports the internal intermediate bearing 31 which will be hereinafter more fully described. The lower collar 24 also engages a spacing ring 32, as clearly shown in Figure 14 of the drawings. The supporting post 8 has rotatably mounted therein the inner sleeves 33 and 34 which are provided respectively for the upper and lower tone arms 9 and 10. The rotatable sleeves 33 and 34 are each provided with tapered openings 35, in which is adapted to fit the tapered flange 36 formed on the inner end of the nipples 26 and 27. The nipples 26 and 27 have mounted thereon intermediate the tone arms 9 and 10 and the sleeves 33 and 34 spacing rings 38 and it can be seen that the tone arms are clamped in position on to their respective supporting sleeves by means of the nipples 26 and 27. The innermost sleeve 33 which supports the upper tone arm 9 is provided with a plurality of slots 39 which form a gateway for permitting the sound from the tone arm 10 to pass into the post 8 and down into the sound amplifying horn 6. The sleeves 33 and 34 are rotatably held in position in the supporting post 8 by means of the upper bearings 40, intermediate bearings 31 and lower bearings 41. The lower bearings 41 rotatably support the lower end of both of the sleeves 33 and 34 and this bearing is held in position by suitable fastening elements 42. The intermediate bearings 31 engage the upper end of sleeve 34, while the upper bearing 40 supports the upper end of the inner sleeve 33. The bearings 40, 31 and 41 have suitable ball races formed therein for supporting the sleeves. Thus it can be seen that the upper and lower tone arms 9 and 10 are freely supported for rotatable movement by the supporting post 8. The upper end of the supporting post 8 has secured thereto by suitable fastening elements 43 an internally threaded coupling 44 which is adapted to unite to the supporting post 8, and the clamping means 45 for the double disc records indicated by the numeral 46 on the turn table mechanism 11. The sleeves 33 and 34 carry respectively the pins 47 and 48, which extend outwardly through the post 8 and to permit the free movement of the pins 47 and 48, the supporting post 8, the lower spacing ring 32 and the lower bearings 41 are provided with aligned arcuate slots 49 through which the pins are adapted to protrude. These pins are connected to the sleeves 33 and 34 in any preferred manner and are adapted to engage and operate the clutch mechanism 50 for controlling the direction of rotation of the turn table 11 and center pin mechanism 12 as will be hereinafter more fully described. Each of the tone arms 9 and 10 carries reproducers 51 and 52 for engaging in the sound grooves formed in the upper and lower faces of the disc record 46.

The turn table 11 and center pin mechanism 12 is rotatably supported by the top plate 5, and the center pin 12 has its lower end threaded into a collar 54, the lower end of which has secured thereto the vertically disposed shaft 55, which has secured thereto the relatively large friction wheel 56 which forms a portion of the means 50 for controlling the direction of rotation of the center pin 12 and turn table 11. The collar 54 is rotatably mounted in a cylindrical casing 57 which carries upper and lower bearings 58 carrying ball races which rotatably support the upper and lower terminals of the sleeve 54. The cylinder casing 57 is adjustably held in position on the top plate 5 of the phonograph cabinet by means of an internally threaded sleeve 59 which is positioned through an opening 60 formed in the top plate which carries the upper and lower guard members 61, which surround the opening. The guard members 61 are engaged by upper and lower nuts 62 and 63 which hold the sleeve in position. The upper terminal of the internally threaded sleeve 59 is provided with a plurality of inwardly extending tapered notches or slots 64, which slidably receive the wedge shaped members 65 which are clearly shown in Figure 5 of the drawings. The wedge shaped members 65 are similar to or the same as the wedge shaped members 19 used for holding the post 8 in position on the top plate 5. The wedge shaped members 65 are provided with arcuate grooves 66 for the reception of the retaining ring 67 which holds the wedges in position against accidental displacement in relation to one another. The upper nut 62 is provided with an inwardly extending annular flange 68 which engages the upper surfaces of the wedges 65 and it can be seen by tightening the nut 62 the wedges can be forced downwardly into the tapered slot into tight engagement with the casing 57 and thus hold the same against displacement. The turn table 11 is formed relatively small so as to readily engage the inner portion of a record and not come in contact with the sound grooves formed therein. The table 11 is adjustably mounted on the pin 12 and is held in position by means of adjustable wedge members 69 which are similar to the wedge members 65. The wedge members 69 are slidably mounted in tapered openings 69' formed in the depending externally threaded sleeve 70 formed on the lower surface of the table 11. The wedge members 69 are held in position by a suitable retaining ring 71 and the wedges are adapted to be engaged by the inwardly extending annular flange 72 formed on the adjusting nut 73 which is engaged by the depending threaded sleeve 70. Thus it can be seen that when the nut 73 is adjusted on the sleeve, the wedges will be forced into tight engagement with the pin 12 and thus firmly hold the table in position thereon.

The means 45 for holding the tablet or record 46 on the turn table 11 and the center pin 12 consists of an adjustable beam 75 and a stationary supporting post 76 which is connected to the coupling 44 of the supporting post 8, by means of an intermediate coupling member 77 which is threaded into engagement with the coupling 44. The intermediate coupling member 77 has adjustably mounted thereon a nut or the like 78 which engages the outer face of the supporting post 76 and the supporting post 76 is connected thereto by means of fastening elements 79, which also extend through an inner spaced cylindrical casing 80. The inner spaced cylindrical casing 80 is held in spaced relation to the supporting post 76 by means of a spacing collar 81. The outer supporting post 76 has slidably and rotatably mounted thereon the collar 81', which carries the stationary section 82 of the adjustable beam 75. The sliding section 83 of the beam 75 telescopes in the section 82 and the same is held in adjusted position by means of a nut 84, which is fitted on the outer surface of the section 82, and this nut is provided with an inwardly extending flange 85 which is adapted to engage the outer faces of a plurality of wedge shaped members 86 which are slidably fitted in tapered spaced slots 87 formed in the outer end. The wedges 86 are similar to the wedges 65 illustrated in Figure 5 of the drawings and these wedges are also held in assembled position by means of a retaining ring 88. It can be seen that by adjusting the nut 84 the wedges will be forced inwardly and into tight engagement with the section 83 of the beam 75 and hold the same in correct adjusted position. The outer section 83 of the beam 75 carries a vertically disposed casing 89 in which is slidably mounted the plunger 90, which carries the depending rod 91. The depending rod 91 carries an enlarged head 92 on which is threaded a circular disc 93, which is adapted to engage the upper face of a record and hold the same in correct position on the turn table. The head 92 of the pin 91 is provided with an inwardly extending socket 94 for the reception of the center pin 12. The plunger 90 and the pin 91 are normally urged downwardly in the casing 89 by means of an expansion coil spring 95 and this downward movement is limited by means of a collar 96 secured to the pin which is adapted to engage the upper surface of the bearing 97 which is threaded into contact with the lower end of the plunger 90. Thus it will be seen that the pin 91 is supported for free rotation within the casing 89 and it is also permitted to have free sliding movement therein. When it is desired to hold the record in position against accidental displacement on the turn table the beam 75 is pushed downwardly which slides the collar 81' on the post 76 and moves the disc 93 into engagement with the upper surface of the turn table and a lock 89' is provided which automatically holds the beam in its lowered position. The lock 89' includes a sleeve 90' slidably and rotatably mounted on a solid center post 91' which is held against displacement by a suitable fastening element 92' which extends through arcuate slots 93' formed in the post 76 and the inner sleeve 80. The fastening element 92' is carried by a rotatable knurled ring 94' the purpose of which will be hereinafter more fully described. The inner sleeve 80 has coiled around the same the tension spring 95' one end of which is secured to a diametrically extending pin 96' which is carried by the upper end of the solid center post or pin 91' and the cap 97' which is rotatably mounted on the outer post 76. The inner sleeve 80 is provided with a slot 98' for the reception of the same. The lower end of the spring 95' is secured to a lower pin 99, which is carried by the lower end of the collar 81'. The outer post 76 and the inner sleeve 80 are each provided with the bayonet slots 100 and 101, in which is slidably mounted the pin 99. The inner end of the pin 99 is also slidably mounted in an arcuate slot 102 formed in the inner sleeve 90'. The inner post 91' also carries the outwardly extending pin 103 which is slidably mounted in a vertically disposed slot 104 which is disposed in angular relation to the horizontally arranged arcuate slot 102. The sleeve 90' is also provided with a bayonet slot 105 which is directly opposite the horizontally disposed slot 102 and this bayonet slot 105 is adapted to slidably receive a pin 106 carried by the inner sleeve 80.

When it is desired to move the disc 93 into engagement with the upper surface of a record, the beam 75 is moved on the post 76 until the pin 99 rides out of the angularly disposed portion of the bayonet slots 100 and 101 at which time the beam is pushed downwardly until the disc comes into tight engagement with the record 46. When the beam 75 is rotated and then pushed downwardly the spring 95' is moved into position as shown in Figure 19 and placed under tension. The inner sleeve 90' is moved downwardly with the beam 75 owing to the pin 99 and when the pin 106 rides to the upper end of the bayonet slot 105 the spring 95' is permitted to move the post 91', which will swing the pin 106 into the right angular portion of the bayonet slot 105 and hold the beam against upward movement on the post 76. When it is desired to release the disc 93 from engagement with the record 46 it is merely necessary to turn the cap 97' or the ring 94'. It can be seen that by turning the ring 94' or the cap 97' the center pin or post 91' will be rotated, which will move the sleeve 90' therewith owing to the connection between the post and sleeve which is the pin 103 and the slots 104. When the sleeve 90' has been rotated to such a position that the pin 106 overlies the vertical portion of the bayonet slot 105, the sleeve 90' will be automatically returned to its normal position by the spring 95' and through the pin 99 return the beam to its normal position.

The improved means for controlling the direction of rotation of the turn table 11 includes a horizontally disposed countershaft 107, which is rotatably mounted in suitable depending brackets 108 secured to the lower surface of the top plate 5 of the phonograph cabinet. The brackets 108 also support the vertically disposed shaft 55. The counter shaft 107 has keyed or otherwise secured thereto a bevelled gear 109 which meshes with a bevelled gear 110 keyed to the upper end of the drive shaft 111 of any preferred type of motor. The counter shaft 107 has adjustably mounted thereon for rotation therewith a sleeve 112. The sleeve 112 is held in adjusted position on the shaft 107 for rotation therewith by means of clamping members 113, which are clearly shown in Figure 23 of the drawings. These clamping members 113 include a plurality of wedge shaped members 114, which are shaped similar to the wedge shaped members 65 shown in Figure 5 of the drawings, and the same are provided with arcuate grooves for the reception of the retaining ring 115. These wedge shaped members 114 are slidably mounted in wedge shaped slots 116 formed in the terminals of the sleeve 112. The terminals of the sleeve are externally threaded and adjustably support the nuts 117 which are provided with inwardly extending annular flanges 118 which are adapted to engage the outer edges of the wedges 114. The sleeve 112 has slidably mounted thereon the oppositely disposed friction wheels 119 and 120 which are arranged on the opposite sides of the relatively large friction wheel 56. These friction wheels 119 and 120 are secured to the sliding collars 121 and 122, which carry inwardly extending rings 123. These rings are disposed at the terminals of the collars and are secured in place by inwardly extending pins 124, which also extend into grooves 125 formed in the sleeve 112. The collars 121 and 122 inclose stationary rings 126 and 127 and these rings have bearing against the same the outer ends of coil springs 128 and 129. The inner ends of the coil springs 128 and 129 bear against the rings 123 carried by the collars 121 and 122. Thus it will be seen that the friction wheels 119 and 120 are normally urged into engagement with the friction wheel 56. These wheels 119 and 120 are adapted to be held out of engagement with the friction wheel 56 by means of the pins 47 and 48 engaging the levers 130 and 131 when the tone arms 9 and 10 are swung to inoperative positions out of engagement with the record or playing tablet. The levers 130 and 131 are rotatably mounted upon supporting pins 132 and 133 which are carried by an outwardly extending bracket 134 which is bolted or otherwise secured to the post 8. The outer end of the bracket 134 is T-shaped as indicated by the numeral 135 and the arms of the T-shaped extension slidably supports the pins 133 and 132 and these pins are held against accidental displacement by fastening elements 136. The levers 130 and 131 are prevented from accidental displacement from off of the discs 132 and 133 by means of nuts 137. The levers 130 and 131 are formed in two sections so that the length of the same can be adjusted as clearly shown in Figures 1 and 29 of the drawings. The sections of the levers 130 and 131 are held in adjusted position by suitable set screws 138. The outer ends of the levers 130 and 131 are angled as at 139 and carry cross shaped members 140 which carry inwardly extending pins 141 and are adjusted to slidably fit in annular grooves 142 of the hubs of the friction wheels 119 and 120. The levers 130 and 131 are provided with inwardly extending feet 143 directly in rear of the pivot pins 132 and 133 and these portions of the levers are adapted to be engaged by the pins 47 and 48.

In Figures 24, 25 and 26 are illustrated sectional views showing the playing angles of the tone arms and the pins 47 and 48. The playing angles of both tone arms is illustrated by the dot and dash lines indicated by the numeral 144. The pins 47 and 48 are located at different angles to each other and to the tone arms 9 and 10 and the uppermost pin 47 is operated by the lowermost tone arm 10 while the lowermost pin 48 is operated by the upper tone arm 9 and the pin 47 is adapted to engage the foot 143 of the lever 130 while the pin 48 is adapted to engage the foot 143 of the lever 131. When the tone arm 10 is moved to its extreme right, the pin 47 is moved toward the center and into engagement with the foot 143 of the lever 130 as clearly shown in Figure 24 which swings the lever on its pivot and moves the friction disc 120 out of engagement with the friction disc 56. But when the tone arm 10 is swung into record playing position, the pin will be moved out of engagement with the foot 143 of the lever 130 and permit the friction disc 120 to move into engagement with the friction disc 56. The pin 47 will then move through an angle indicated by the dot and dash lines designated by the numeral 146. When the upper tone arm 9 is in playing position the lower pin 48 will operate through an angle indicated by the dot and dash line designated by the numeral 147 and will not come into engagement with the foot 143 of the lever 131 or the foot of the lever 130. When the upper tone arm is moved to inoperative position the pin 48 will move through an angle indicated by the dot and dash line designated by the numeral 148 and will engage the foot 143 of the lever 131 and thus move the friction wheel 119 out of engagement with the relatively large friction wheel 56. The friction wheels 119 and 120 form means for controlling the direction of rotation of the turn table and it is absolutely necessary for the turn table to rotate in an opposite direction when the lower tone arm is in operation so that the direction of the sound groove in the lower surface of the record will be in correct relation to the stylus of the reproducer 52. The inoperative position for both of the tone arms 9 and 10 is indicated by the dash and dot line designated by the numeral 149 and thus in Figure 24 of the drawings the lower tone arm would be in the position indicated by the line 149 and the upper pin 47 in engagement with the foot 143 of the lever 130 and the friction wheel 120 out of engagement with the friction wheel 56 as clearly shown in this figure. When the tone arm 9 is in position indicated by the lines 144, the pin 48 is out of engagement with the foot 143 of the lever 131 which allows the coil spring 128 to force the friction wheel 119 into engagement with the friction wheel 56. This permits the turn table to rotate in a clockwise direction.

To hold the needle or stylus of the reproducer 52 into engagement with the sound groove formed in the lower surface of the record when the tone arm 10 has been moved to playing position, a sliding weight 150 is mounted on a diametrically extending rod 151 which has its terminals secured to the rotating ring of the reproducer which carries the stylus or needle. Thus it will be seen that when the weight 150 is slid to the upper end of the bar or rod 151 as shown in Figure 1 of the drawings, the weight tends to rotate the ring of the reproducer and hold the stylus out of engagement with the record tablet. When the reproducer is moved on the tone arm at right angles to the position shown in Figure 1, the weight 150 is slid to the lower end of the bar which will tend to hold the needle or stylus in engagement with the sound groove.

To facilitate the positioning of the stylus of the lower reproducer 52 in correct engagement with the sound grooves in the lower surface of the record, a mirror or the like 152 is mounted in a suitable frame work 153 on the upper surface of the top plate 5 of the phonograph cabinet and this mirror 152 is positioned directly below the lower tone arm and thus the operator merely has to look in the mirror to see if the needle or stylus is in the first sound groove.

In operation of the improved device, the desired record is placed on the turn table 11 and the beam 75 is rotated on the post 76 until the disc 93 is directly over the center pin 12, at which time the beam is forced downwardly as heretobefore stated until the pin 106 has moved to the upper end of the groove 105 at which time the internal locking sleeve 90' will be permitted to rotate under the influence of the spring 95' and hold the beam in its downward locked position. If it is desired to play the selection on the upper surface of the record, the tone arm 10 is moved into position indicated by the dot and dash line 139 which will move the pin 47 into engagement with the foot 143 of the operating lever 130 and move the friction wheel 120 out of engagement with the friction wheel 56, and the motor is then started in the ordinary manner. The upper tone arm 9 is swung to the first dot and dash line 144 which will move the pin 48 out of engagement with the foot 143 of the lever 131 and permit the spring 128 to move the friction wheel 119 into engagement with the friction wheel 56. Thus the turn table will be rotated in a clockwise direction and the selection will be played in the ordinary manner. When the end of the selection has been reached, the operator moves the tone arm 9 back to the inoperative position indicated by the line 149 which stops the rotation of the turn table. The lower tone arm 10 is then moved to the first dot and dash line 134 and the needle placed in the first sound groove. This operation will move the lower pin 48 into engagement with the foot 143 of the lever 131 and move the wheel 119 out of engagement with the friction wheel 56 and the pin 47 will be moved out of engagement with the foot 143 of the lever 130 and thus permit the spring 129 of the friction wheel 120 to move the friction wheel into engagement with the friction wheel 56. This will rotate the turn table in a counter clockwise direction and permit the correct playing of the lower surface of the record.

When both sides of the record have been played, it is merely necessary to rotate the ring 94' or the cap 97' which will, as stated, turn the center post or pin 91' and carry the locking sleeve 90' to such a position that the pin 106 will be in alignment with the vertical portion of the bayonet slot 105 at which time the spring will return the sleeve and the beam to its normal position and permit the record to be moved from the turn table and center pin and a new record placed thereon.

From the foregoing description it can be seen that an improved phonograph is provided in which the necessity of turning a double disc record over for the playing of both sides thereof is eliminated.

Changes in details may be made without departing from the spirit or scope of the invention; but,

We claim:

1. In a sound reproducing machine, a turn table, a pair of tone arms, reproducers carried by the tone arms, means for rotating the turn table, and means for controlling the rotation of the turn table one direction by one of said tone arms, and means for controlling the rotation of the turn table in the opposite direction by the other tone arm.

2. In a sound reproducing machine, a turn table, arranged to support double disc records and expose the sound grooves of both surfaces thereof, a pair of tone arms arranged above and below said turn table, reproducers carried by the tone arm, means for rotating the turn table, and means for starting, stopping and controlling the direction of rotation of the turn table by either one of the tone arms.

3. In a sound reproducing machine, a turn table arranged to support double disc records so as to expose the sound grooves in both surfaces thereof, means for rotating the turn table, a tone arm arranged above and below the turn table, reproducers carried by the tone arms and arranged to be brought into engagement with the upper and lower surfaces of the double disc record, and means operated by the tone arms for starting, stopping and controlling the direction of rotation of the turn table.

4. In a sound reproducing apparatus, a turn table, a pair of swinging tone arms, a drive shaft, a supporting shaft for the turn table, a drive wheel carried by the supporting shaft, drive wheels carried by the drive shaft arranged to be moved into engagement with the opposite sides of the drive wheel carried by the supporting shaft, and means operated by the tone arm for moving the drive wheels out of engagement with the drive wheel carried by the supporting shaft.

5. In a sound reproducing apparatus, a turn table, a supporting shaft for the turn table, a drive wheel secured to the supporting shaft, a driving shaft, a pair of drive wheels slidably mounted on the drive shaft for rotation therewith, means normally urging the second mentioned drive wheels into engagement with the opposite sides of the first mentioned drive wheel, a pair of tone arms, and means operatively carried by the tone arms arranged to engage the second mentioned drive wheels for moving the same out of engagement with the first mentioned drive wheel.

6. In a sound reproducing machine, a turn table, a supporting shaft for the turn table, a drive shaft, a drive wheel secured to the supporting shaft, a pair of drive wheels slidably supported on the drive shaft, spring means normally urging the second mentioned drive wheels into engagement with the opposite sides of the first mentioned drive wheel, a pair of swinging tone arms, means operatively connecting the tone arms with the second mentioned drive wheels to move the second mentioned drive wheels out of engagement with the first mentioned drive wheel when the tone arms are moved into inoperative position.

7. In a phonograph for playing the upper and lower surfaces of the double disc record without the turning of the record, a turn table arranged to support a double disc record and expose the sound grooves in both faces thereof, a pair of tone arms, means for operating the turn table, and means for connecting the turn table with the said driving means for rotating the turn table in opposite directions upon movement of the tone arms.

8. In a phonograph for playing both faces of a double disc record without the turning of the same, a turn table, a supporting shaft for the turn table, a drive wheel arranged on the supporting shaft, a driven shaft arranged at right angles to the supporting shaft, a pair of sliding friction wheels secured to the driven shaft and arranged to be brought into engagement with the opposite sides of the first mentioned drive wheel, spring means normally urging the second mentioned drive wheels into engagement with the first mentioned drive wheel, a pair of tone arms, pivoted levers arranged to move the second mentioned drive wheels out of engagement with the first mentioned drive wheel, and pins operated by the tone arms engaging said levers.

9. In a phonograph of the character described, a turn table arranged to support a double disc record to expose the upper and lower faces thereof, means to hold the record against accidental displacement on the table, a supporting post, a pair of tone arms rotatably carried by the supporting post, means for rotating the turn table, and means operated by either of the tone arms for bringing said operating means for the turn table into operative engagement therewith.

10. In a phonograph, a supporting shaft, a turntable on the supporting shaft, a driving shaft arranged below and at right angles to the supporting shaft, a friction disc keyed to the supporting shaft, a pair of sliding friction discs slidably mounted on the drive shaft for rotation therewith arranged to engage the opposite sides of the first mentioned friction disc, spring means normally urging the friction disc mounted on the drive shaft into engagement with the first mentioned disc, a pair of pivoted levers operatively connected to the first mentioned friction discs, inwardly extending feet formed on the operating levers, supporting sleeves mounted in said supporting posts and carried by said tone arms, and outwardly extending pins carried by said supporting means and arranged to engage the inwardly extending feet formed on said levers.

11. In a phonograph, a turn table, a supporting shaft for the turntable, means for rotating the turn table, means for controlling the rotation of the turn table and the starting of the turn table including a pair of rotatable tone arms carried by the sleeve, outwardly extending pins carried by the sleeves and arranged at different angles in relation to each other, levers operated by said pins, a drive shaft, drive wheels mounted on the drive shaft, a friction wheel secured to the supporting shaft, and means operatively connecting the levers with the sliding drive wheels on the drive shaft.

12. In a phonograph, a turn table, a supporting shaft for the turn table, a drive shaft, a friction disc secured to the supporting shaft, a pair of sliding friction discs slidably mounted on the drive shaft, a hollow supporting post, a pair of rotatable tone arms mounted above and below the table and supported by said supporting post, rotatable sleeves mounted in said post and secured to said tone arms, outwardly extending pins carried by the supporting sleeves and arranged at different angles in relation to each other, a pair of pivotally mounted levers, means operatively connecting the sliding friction discs with the levers and inwardly extending feet formed on the levers arranged in the path of said pins.

13. In a phonograph, a turn table, a supporting shaft for the turn table, a friction disc keyed to the supporting shaft, a drive shaft arranged at right angles to the supporting shaft, a pair of sliding friction dics secured to the drive shaft for rotation therewith, means normally urging the friction discs into engagement with the opposite sides of the first mentioned friction disc, a hollow supporting post, a pair of sleeves rotatably mounted in the post, a pair of tone arms arranged above and below the turn table secured to the sleeves for rotation therewith, superposed outwardly extending pins carried by the rotating sleeve and arranged at different angles in relation to one another, a supporting bracket carried by the supporting post, a pair of supporting pins carried by the bracket, a pair of pivoted levers mounted on the pins, means operatively connecting the levers with the discs carried by the drive shaft, inwardly extending feet carried by the levers, radial pins carried by the sleeves and arranged to be moved into engagement with the feet when the tone arms are moved in a certain direction.

14. In a phonograph, a turn table, a beam slidably mounted above the turn table and terminating in axial alignment with the axial center of the turn table, a vertical shaft slidably mounted on the end of the beam for movement toward and away from the turn table; spring means normally urging the shaft downwardly toward the turn table, and a locking disc carried by the shaft arranged to be moved into engagement with the upper face of a record mounted on the turn table to hold the same against accidental displacement.

15. In a phonograph, a turn table, a supporting post arranged at one side of the turn table, a beam slidably and rotatively carried by the supporting post, a rotatable and slidable spring pressed plunger carried by the beam, and a disc carried by the plunger arranged to engage the upper surface of a record supported on the turn table to hold the same against accidential displacement.

16. In a phonograph, a supporting post, a beam slidably and rotatively carried by the supporting post, means arranged to hold the beam in a lowered position, and rotatable means carried by the beam arranged to engage the upper surface of a record carried by the turn table when the beam is in its lowered position.

17. In a phonograph, a turn table, a supporting post, a beam slidably carried by the supporting post, means normally urging the beam to a raised position, means arranged to hold the beam in a lowered position against the first mentioned means, and spring means carried by the beam arranged to engage the upper surface of a record supported on the turn table.

18. In a phonograph, a turn table, a supporting post, a beam slidably and rotatably carried by the supporting post, means carried by the beam arranged to engage the upper surface of the record supported on the table when the beam is in its lowermost position, a locking sleeve carried by the beam arranged to hold the same in its lowermost position, and means for releasing said locking sleeve.

19. In a phonograph, a turn table arranged to support a double disc record, a supporting post, an inner spaced sleeve mounted in the supporting post, a beam slidably and rotatably carried by the supporting post, means carried by the beam arranged to engage the upper surface of the disc record, a locking sleeve slidably mounted in the inner sleeve, a coil spring arranged around said inner sleeve, and connected to said beam and said locking sleeve to normally hold the same in a raised position, the locking sleeve having a vertical slot and a bayonet slot therein, a pin carried by the inner sleeve arranged to engage in said bayonet slot, a rotatable post arranged in said inner sleeve, a pin carried by the inner post and arranged to engage in said vertical slot, the pin carried by the inner sleeve being arranged to engage in the offset portion of the bayonet slot when the beam and locking sleeve are in their lowermost position, and means for rotating the inner post to rotate said locking sleeve and carry the offset portion of the bayonet slot out of engagement with said pin carried by the inner sleeve.

In testimony whereof we affix our signatures.

RAFAEL J. MARDONEZ.
PETER HANSEN.